United States Patent
Herndon

(10) Patent No.: US 6,367,820 B1
(45) Date of Patent: Apr. 9, 2002

(54) SNOW SURF BOARD

(76) Inventor: Warren Herndon, 1485 Jeffrey Ave., San Jose, CA (US) 95118

(*) Notice: Subject to any disclaimer, the term of this patent is extended or adjusted under 35 U.S.C. 154(b) by 0 days.

(21) Appl. No.: 09/660,539

(22) Filed: Sep. 9, 2000

(51) Int. Cl.[7] .............................................. B62B 13/06
(52) U.S. Cl. ...................... 280/18.1; 280/18; 280/22.1
(58) Field of Search ........................ 280/18.1, 18, 19, 280/19.1, 20, 21.1, 22, 22.1, 26, 15, 16

(56) References Cited

U.S. PATENT DOCUMENTS

| | | | | |
|---|---|---|---|---|
| 3,123,374 A | * | 3/1964 | MacLeod .................... | 280/18.1 |
| 3,711,108 A | * | 1/1973 | Orozco et al. ............. | 280/21.1 |
| 3,794,341 A | * | 2/1974 | Torok .......................... | 280/18 |
| 3,884,490 A | * | 5/1975 | Hellman ..................... | 280/18 |
| 3,901,526 A | * | 8/1975 | Scott et al. ................. | 280/18.1 |
| 4,413,832 A | * | 11/1983 | Pendleton ................... | 280/845 |
| 4,609,201 A | * | 9/1986 | Flachsmann ................. | 280/20 |
| 5,149,117 A | * | 9/1992 | Wilkens, Sr. et al. ...... | 280/18.1 |
| 5,486,013 A | * | 1/1996 | Kilk et al. ................. | 280/18.1 |
| D374,846 S | * | 10/1996 | Dickhaut et al. ............ | D12/11 |

* cited by examiner

*Primary Examiner*—J. J. Swann
*Assistant Examiner*—James S. McClellan
(74) *Attorney, Agent, or Firm*—Robert Samuel Smith

(57) ABSTRACT

A snow board with a ground contacting surface having a bulbous area at the forward end of the board and two ridges extending along from the bulbous area toward the rear end of the board. Each ridge is close to one edge opposite the other ridge and is curved convexly toward a centerline of the board. The rider, sitting or kneeling on the board while sliding downhill, can lean forward so that the bulbous forward area is supported by the slippery surface and in this position, the rider can cause the board to "spin". In another mode, the rider shifts his weight rearwardly so that the ridges are in contact with the ground. By leaning to one side or the other, the respective ridge contacts the ground and the shape of the ridge causes the board to turn.

5 Claims, 3 Drawing Sheets

SNOW SURF BOARD

FIELD OF THE INVENTION

This invention relates to boards for sliding downhill in the snow and particularly to a snow board with a contoured bottom that enables the rider to steer the board and permit the rider to face various selected directions as he slides downhill.

BACKGROUND AND INFORMATION DISCLOSURE

Many devices have been built for the amusement of sliding down a snow covered hill.

For example U.S. Pat. No. 3,794,341 to Torok discloses a snow sled including a central body between two outrigger arms extending from either side of the central body. The out rigger arms are rotatably attached to the central body and are turned by the rider in order to steer the sled.

U.S. Pat. No. 466,171 to Sellers discloses a recreational snow sled having a longitudinal central rib forming a U shaped bottom the rider kneels on the base and straddles the rib.

U.S. Pat. No. De. 319,806 discloses a board having a base contoured for sitting and grasping a pair of handles on opposite sides with a ridge down the center of the bottom surface. None of the boards disclosed in the cited art offer the range of maneuverability which distinguishes the present invention

Summary of the Invention

It is an object of this invention to provide a board for sliding down a snow covered hill according to various modes. In one mode, the user kneels on the sled, facing in the direction of travel , and steers the board by grasping the edges of the board and tilting the board from one side to another. In another mode, the user tilts the board forward so that the board is sliding nose down enabling the rider to turn the board while in descent. In another mode, the rider stands on the board holding one end of a tether whose other end is secured to the board.

This invention is directed toward a board having a front area whose bottom is bulbous. Two curved ridges extend rearwardly from the convex with each ridge nearer one edge opposite the other ridge. The ridges are curved away from the centerline of the board. The function of the ridges and convex area is that the rider is enabled to lean forward so that all of the contact area is within the bulbous area enabling the rider to slide down the hill turned in any direction or the rider may lean back so that the rearwardly extending ridges cut through the snow and by leaning to the port or starboard the rider is enabled to steer the board.

Figure 1:
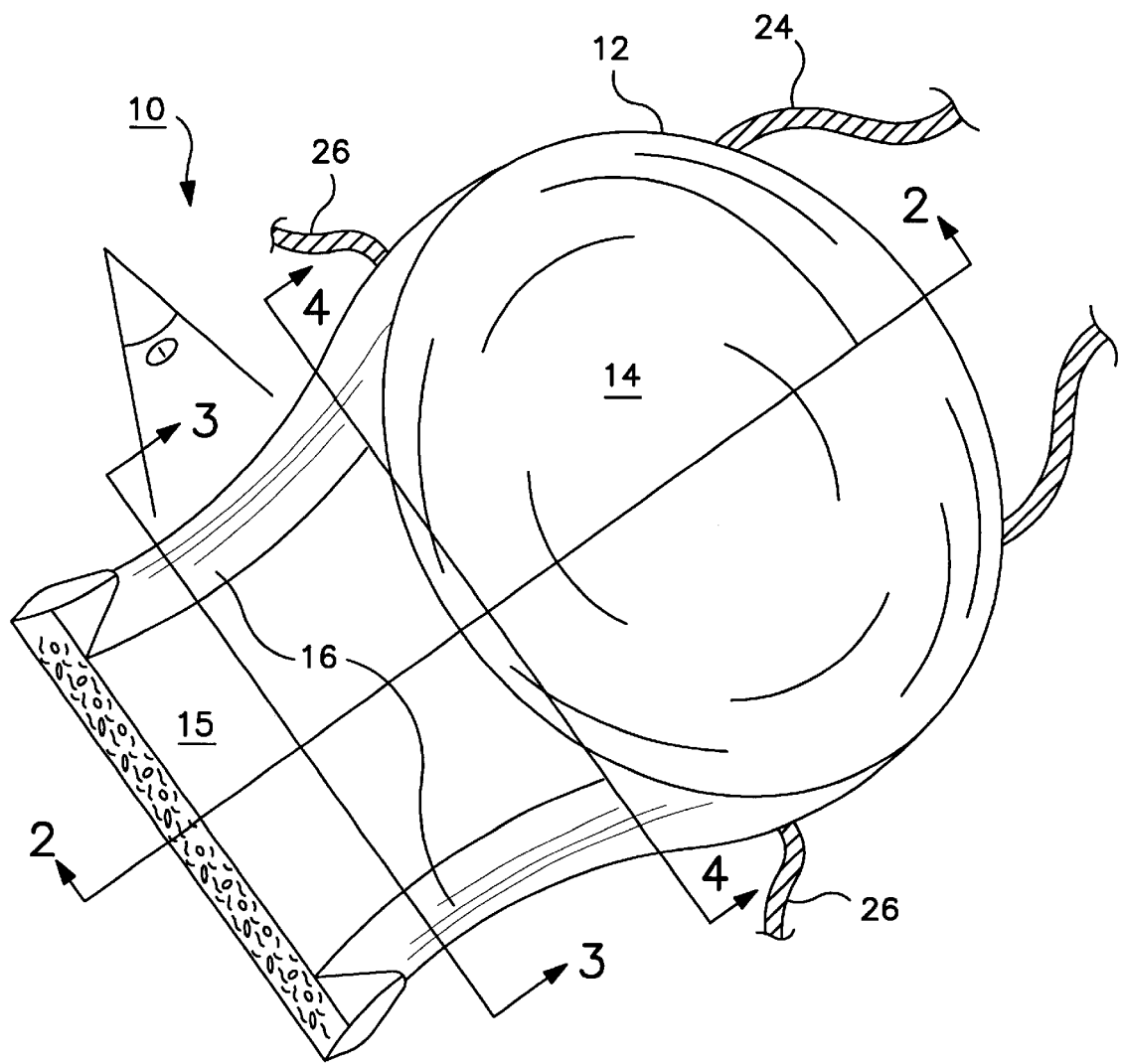
FIG. 1 is a perspective view showing the bottom of the snowboard.

DESCRIPTION OF A BEST MODE:

Turning now to a discussion of the drawings, FIG. 1 is a perspective view of the bottom surface the snow board 10 of this invention showing the board 10 to be substantially rectangular except that the boundary on one end 12 of the board 10 is curved. The board 10 has a rear section 15 that is flat (except for ridges 16) joined to a forward area 14 that is bulbous and concave looking down onto the top surface of the board.

A ridge 16 is formed in the flat section 15 along each edge of the board extending away from the bulbous area 14.

Figure 2:
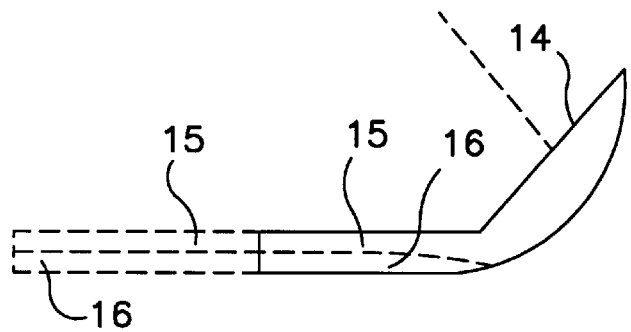
FIG. 2 is a sectional longitudinal view along the centerline.

FIG.2 is a side view showing that the forward bulbous section 14 is generally tilted with respect to rear section 15 sufficiently to enable the rider to lean forward so that the forward section 14 is in ground contact or lean backward to provide that the rear section is in ground contact.

Figure 3:
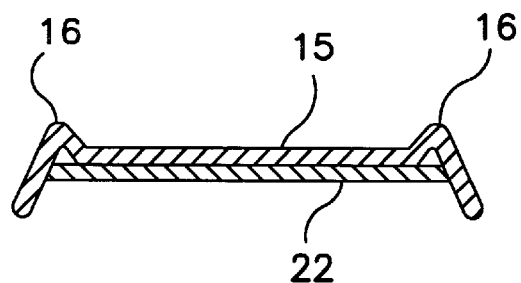
FIG. 3 is a sectional view near the rear end of the snow board.
Figure 4:
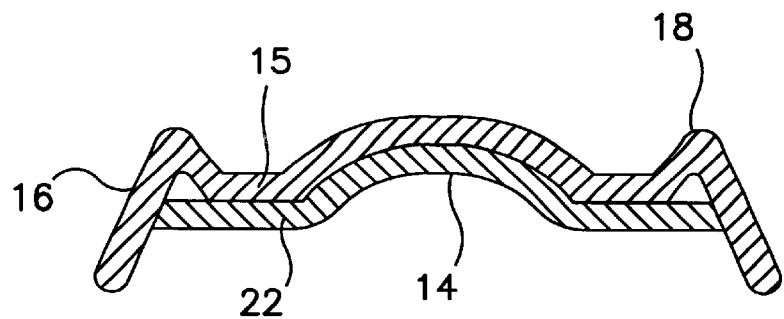
FIG. 4 is a sectional view showing the bulbous front end merging into the two curved lateral runners.

FIGS. 3 and 4 are sectional views of the board showing the relation of the ridges, flat section 15 and bulbous section 14.

Figure 5:
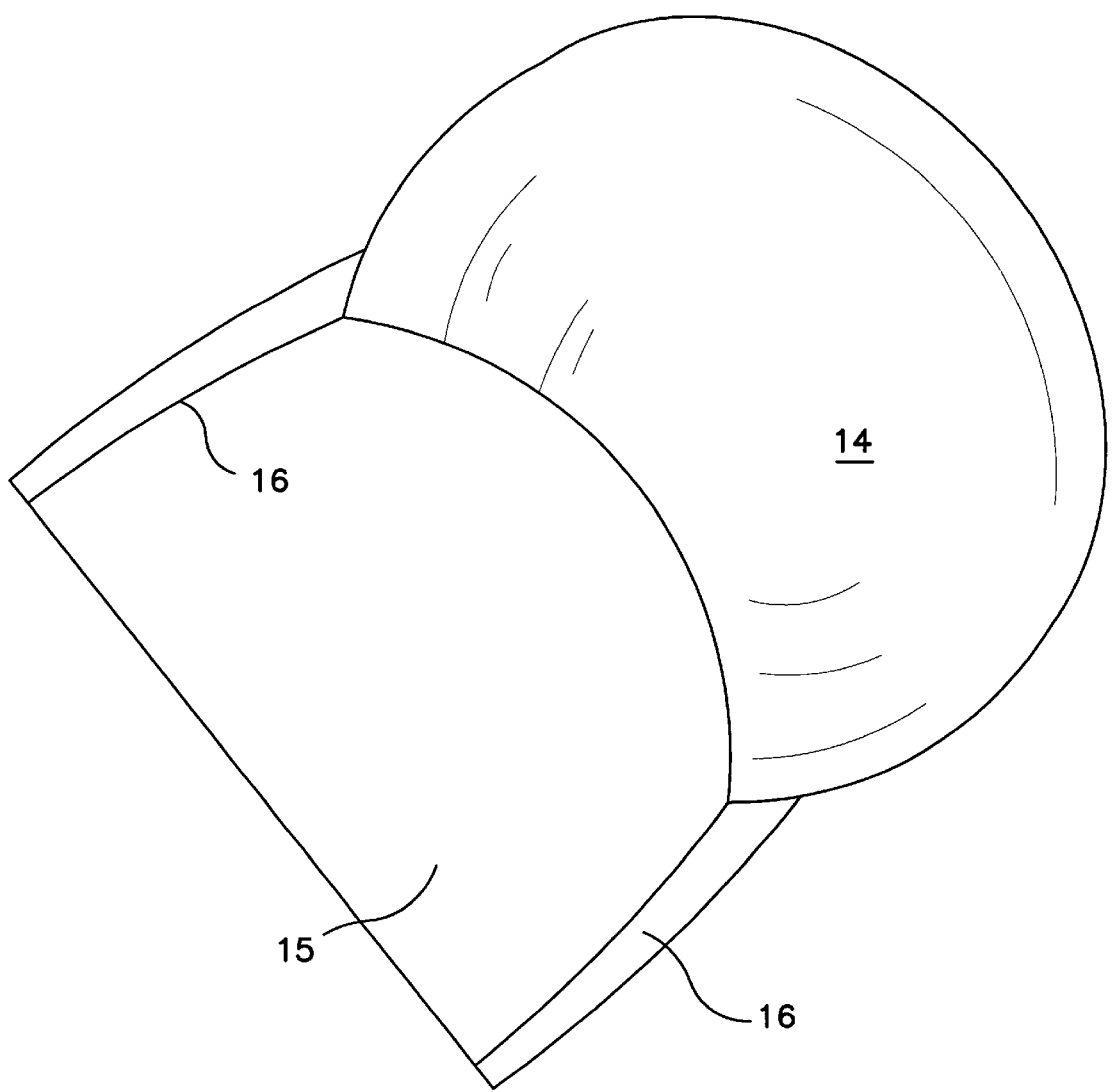
FIG. 5 shows a version in which the ridges are concave away from the center plane.

FIG. 5 shows another embodiment, in which the curve in each ridge is concave away from the center of the board so that the board is steered by the rider leaning in an opposite direction than in the former case of the curvature.

In FIG. 1, each ridge 16 is curved concave toward the center of the board 10 enabling the rider to steer the board by leaning to one side of the board to turn in one direction and leaning toward the opposite side to steer in the opposite direction.

In one embodiment, a foam pad 22 is positioned to enable a rider to sit or kneel in greater comfort on the board during his descent down the hill.

The bulbous area 14 joined to the straight section area with ridges 16 enables the rider to ride down a slope in either one of two modes.

In one mode, the rider leans forward so that the bulbous area 14 is in contact with the snow covered slope. In this mode, the board is "free falling " in the sense that the board may spin on the surface giving the rider a sense of "free falling ".

In another mode, the rider leans back so that the rear section with ridges is in contact with the slope so that the rider can steer the board as described above.

The board 10 is preferably a thermoformed sheet of plastic, about ⅛ to ¾ inches thick. A suitable material for this purpose is any one of a number of thermoformable plastics such as belong to the class—polyvinylchloride, polyethylene, polypropylene, or cast polymerizable sheets such as polyvinylacetate, or polyurethane.

In one embodiment, a foam pad 22 is positioned to enable a rider to sit or kneel in greater comfort on the board during his descent down the hill.

In another embodiment, a rope 24 has at least one end attached to the "nose end " of the board enabling the rider to stand on the board 10 and hold onto the rope 24 during descent.

In another embodiments rope handles 26 (shown partially cutaway) on either side of the board enable the user to carry the board conveniently on his back.

The dimensions of the board are selected according to the size of the rider and is preferably about two thirds the height of the rider. The width at the widest location is about 30 inches for a board that is about 42 inches. A range of overall length is preferably in the range of 30 to 60 inches. A preferable range of width of the bulbous section is preferably 29 to 30 inches. The curvature of the ridges is in the range of eighteen to 30 inches.

There has been described a snow "surf": board which can be ridden in either one of wo modes.

In one mode, the rider leans forward so that the bulbous area 14 is in contact with the snow covert slope. In this mode, the board is "free falling" in the sense that the board may spin on the surface giving the rider a sense of "free falling".

In another mode, the rider leans back so that the rear section with ridges are in contact with the slope so that the rider can steer the board as described above.

Variations or modifications of this invention may be contemplated after reading the specification and studying the drawings which are within the scope and spirit of this invention, I therefore wish to define the scope of my invention by the appended claims.

For example, the runners may be partially metal so as to enhance the "bite" of the runners into the sliding surface.

The surface is a sheet of ice on the side of a hill or the board is towed on a sheet of ice by a skater.

In view of these modifications, I therefore wish to define the scope of my invention by the appended claims.

I claim:

1. A device adapted for enabling a rider, positioned on said device, to slide down a surface of a snow covered hill and control a direction of his slide by shifting his position on said device which constists of:

a single board having a contoured bottom surface arranged for facing and contacting said surface of said snow covered slope and being symmetrical with respect to a center plane of said board;

said board having a bulbous section that is concave looking down onto a top surface of said board and a flat section extending rearwardly from said bulbous section;

two ridges formed on said bottom surface of said flat section;

each one of said two ridges having one end proximal to an edge of said bulbous section and extending generally rearward away from said bulbous section along an edge of said flat section opposite said other ridge extending along an opposite edge of said flat section generally rearward away from said bulbous section along an opposite edge of said flat section;

both of said two ridges having a curvature, said curvature being one of
   (i) concave toward said center plane;
   (ii) concave away from said center plane;

whereby said device is adapted to provide that, when said rider on said top surface of said device is leaning forward to bring said bulbous section into contact with said surface of said snow covered hill, said board is free falling down said hill and when said rider is leaning back to where said ridges are in contact with said slope, then said rider is enabled to steer said board by leaning toward one ridge along one edge of said board to steer said board in one direction and leaning toward said other ridge on said opposite edge of said board to steer said board in an opposite direction.

2. The board of claim 1 wherein an overall length of the board is in the range of 30 to 60 inches and a range of width of the bulbous section is 29 to 30 inches, and the ridges have a lateral curvature is in the range of eighteen to 30 inches.

3. The device of claim 1 wherein said device is a thermoformed sheet of plastic, about $\frac{1}{8}$ to $\frac{3}{4}$ inches thick.

4. The device of claim 1 wherein said board comprises plastic selected from the group of plastics that consists of polyvinylchloride, and polyethylene.

5. The device of claim 1 wherein said board comprises plastic selected from the group of plastics that consists of cast polymerizable plastic, polyvinylacetate and polyurethane.

* * * * *